United States Patent [19]
Walton et al.

[11] 3,970,824
[45] July 20, 1976

[54] ELECTRONIC RECOGNITION AND IDENTIFICATION SYSTEM FOR IDENTIFYING A FAMILY OF CODES

[75] Inventors: Charles A. Walton, Los Gatos; Robert D. Kohler, Santa Clara; David P. Sidlauskas, San Jose, all of Calif.

[73] Assignee: Schlage Electronics, Inc., Sunnyvale, Calif.

[22] Filed: Jan. 13, 1975

[21] Appl. No.: 540,659

[52] U.S. Cl. .................. 235/61.11 H; 343/6.5 LC; 235/61.12 N
[51] Int. Cl.² .................. G06K 7/08; G01S 9/56; G06K 19/06
[58] Field of Search ............... 235/61.11 H, 61.7 B, 235/61.12 N; 340/146.3 K, 280, 152 T, 149 A, 258 C; 343/6.5 LC; 317/134

[56] References Cited
UNITED STATES PATENTS

| | | | |
|---|---|---|---|
| 3,299,424 | 1/1967 | Vinding | 343/6.5 LC |
| 3,713,133 | 1/1973 | Nathans | 340/280 |
| 3,752,960 | 8/1973 | Walton | 235/61.11 H |
| 3,816,708 | 6/1974 | Walton | 235/61.11 H |
| 3,842,246 | 10/1974 | Kohler | 235/61.11 H |

*Primary Examiner*—Daryl W. Cook
*Assistant Examiner*—Robert M. Kilgore
*Attorney, Agent, or Firm*—Boone, Schatzel & Hamrick

[57] ABSTRACT

An electronic recognition and identification system for recognizing and identifying any one of a family of electrically-coded external objects. The system comprises internal electronics including a pulse widening circuit which enables the system to be responsive to each of the codes of the family of external objects.

9 Claims, 4 Drawing Figures

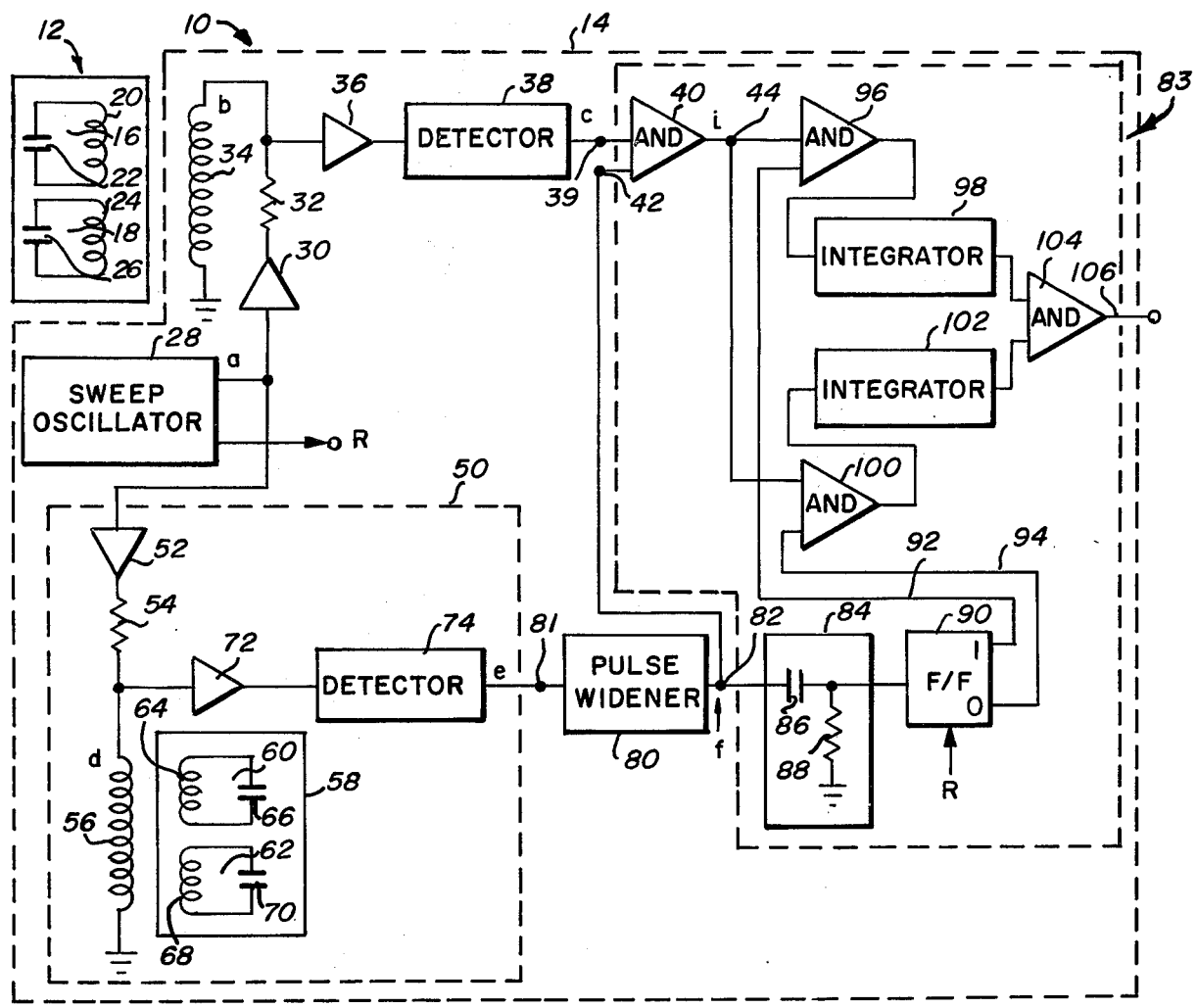
Fig_1
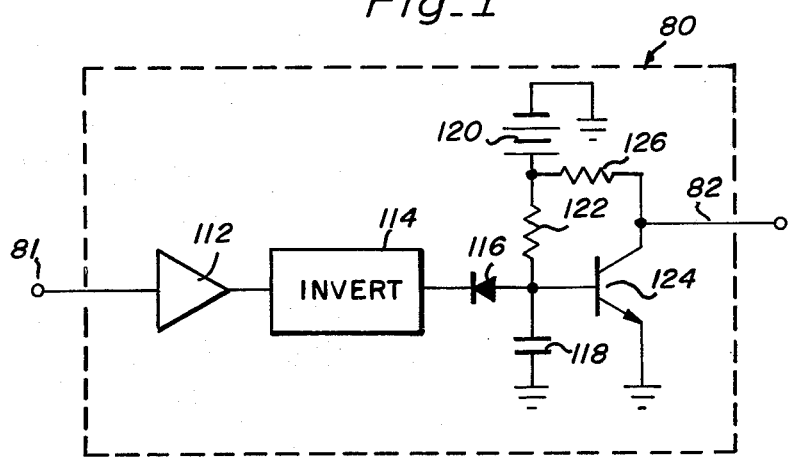
Fig_3

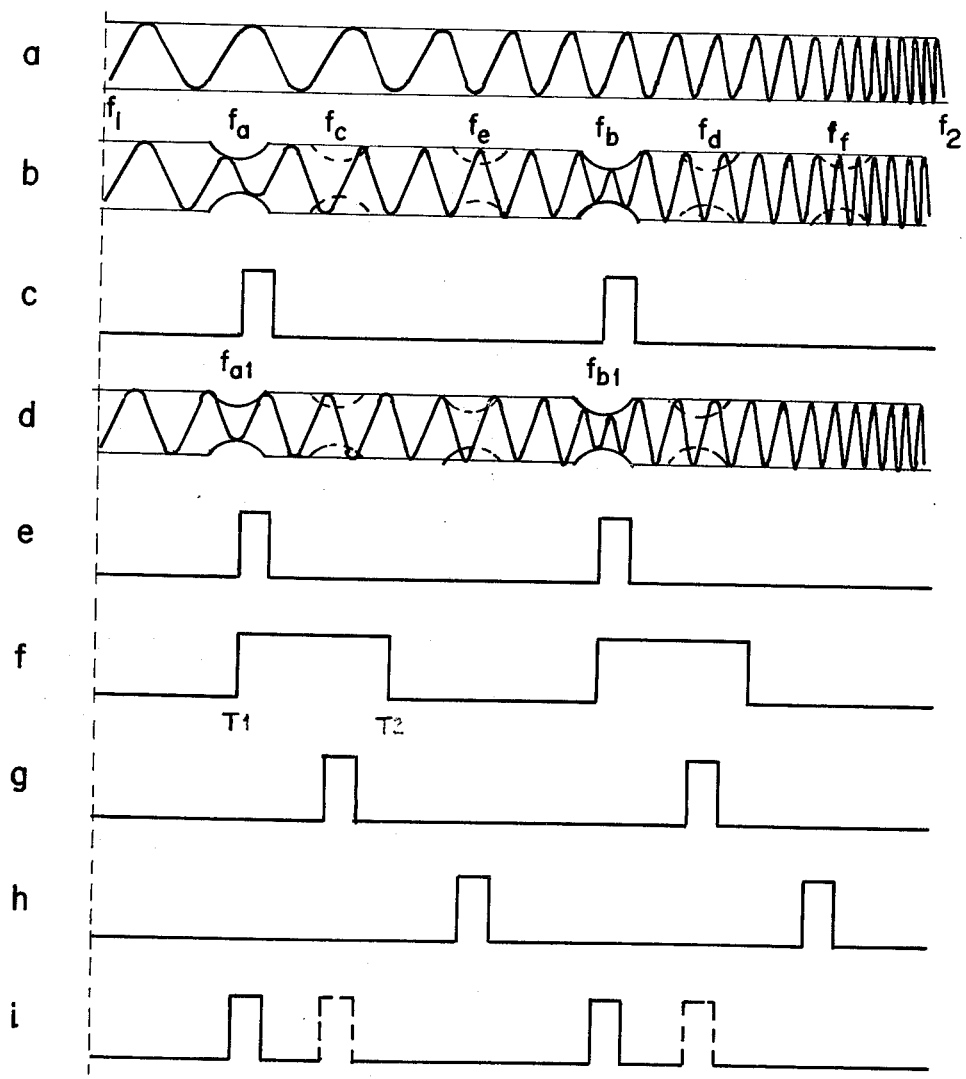
Fig_2
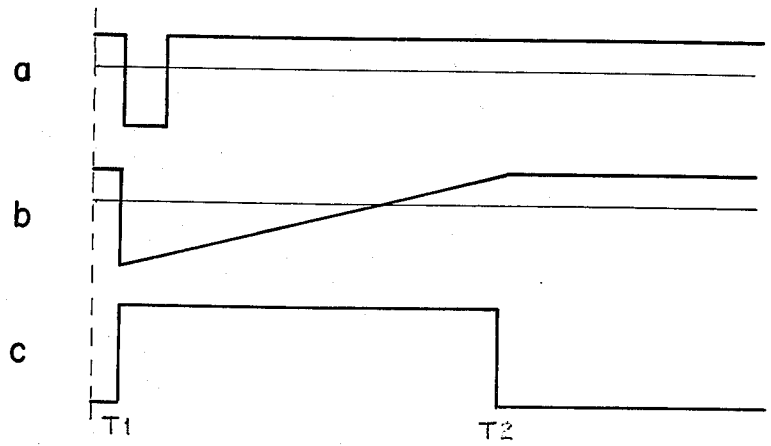
Fig_4

ELECTRONIC RECOGNITION AND IDENTIFICATION SYSTEM FOR IDENTIFYING A FAMILY OF CODES

BACKGROUND OF THE INVENTION

1. Field of the Invention

The present invention relates generally to electronic recognition and identification systems for recognizing and identifying electrically-coded objects and more particularly to a system including an electrical network adapted to respond to the frequency of coded electrical resonant circuits.

2. Description of the Prior Art

Electronic recognition and identification systems such as the common lock and key systems presently exist for performing various functions relative to portal control. For example, an individual may carry an electrically-coded identification card (key) for presentation to a reading station when the individual desires to enter a door. If the card carries an appropriate code, responsive identification control signals are generated, which in turn permit the opening of the door.

In another application an object may carry an identification card electrically-coded to identify the object. As the card passes a reading station, the code is read and responsive identification control signals are generated. The identification signals may accordingly be utilized to control associated object processing equipment or, if the object is in transit, the destination of the object.

Examples of prior electronic recognition and identification systems may be found in U.S. Pat. No. 3,752,960 entitled "Electronic Identification and Recognition System", U.S. patent application Ser. No. 363,851 entitled "Improved Electronic Recognition and Identification System" filed May 25, 1973, now U.S. Pat. No. 3,816,718, by Charles A. Walton and assigned to the assignee of the present application, and U.S. Pat. No. 3,842,246 entitled "Recognition and Identification System With Noise Rejection Capabilities" by Robert D. Kohler, David P. Sidlauskas and Charles A. Walton and assigned to the assignee of the present application. U.S. Pat. No. 3,732,465 describes an electronic sensing and actuator system.

In various applications, especially those employing locks and keys, it is desirable to have a lock which may be entered by a group of keys, each of which bears a different code. An example of such an application is typically found in an office environment when doors to a group of offices each have an individual key and lock combination with all of the associated group of keys being capable of operating a lock on a door of a common facility. Generally, the common door has a relatively low security, such as for example the main door, the elevator or the washroom.

This application in which many keys, each associated with a specific door, are able to open a common door is commonly referred to as "maisoning". Though maisoning is commonly realized in mechanical lock and key systems, it is unknown in electronic recognition and identification systems of this type.

SUMMARY OF THE PRESENT INVENTION

Accordingly, it is an object of the present invention to provide a system wherein a group of different keys, each being characterized as an external passive card having a specific code, can be used to gain entry through a common door which is responsive to a preselected plurality of the codes.

The electronic recognition and identification system for identifying any one of a family of electrically-coded passive objects each having at least one tuned electrical circuit which is resonant at at least one of a plurality of predetermined frequencies and is adapted to be brought within an external sensing zone of the present invention includes a sensing coil for providing an electromagnetic field within the external sensing zone when energized by an alternating current signal. A radio frequency oscillator generates an alternating current signal for energizing the sensing coil. The alternating current signal has a frequency which varies with time over a range of frequencies including the plurality of predetermined frequencies and has a constant amplitude over the range. Hence, when one of the external passive objects is brought within the external sensing zone the object is inductively coupled to the sensing coil by the electromagnetic field and loads the sensing coil when the frequency of the alternating current signal passes through the predetermined frequency such that the potential developed across the sensing coil is changed during the passage of the predetermined frequency. A signal detector responds to the potential developed across the sensing coil and produces a condition pulse each time the potential drops below a predetermined threshold. The duration of the condition pulse corresponds to the time that the potential remains below the threshold of the detector. An internal reference signal generating network is also energized by the oscillator. The network produces a reference pulse when the alternating current signal passes through the frequency of the first encountered one of the predetermined frequencies. A pulse widening circuit responds to the reference pulse and provides a widened reference pulse having a duration that extends from the time corresponding to the occurrence of the first encountered frequency to the time corresponding to the passage of the alternating current signal through the last encountered one of the predetermined frequencies. A control network responds to the condition pulse and the widened reference pulse and produces a control signal when there is time coincidence between those pulses.

An advantage of the present invention is that it allows a group of distinctly different electrically-coded keys to be used to gain entry through a common door, thus reducing the costs associated with an electronic door/key system.

The foregoing and other objects, features and advantages of the invention will be apparent from the following detailed description of the preferred embodiment illustrated in the several figures of the drawing.

IN THE DRAWING

FIG. 1 is a block circuit diagram illustrating an electronic recognition and identification system in accordance with the present invention;

FIG. 2 is a graphical representation of the wave shapes and time relationships of signals encountered at various points in the system of FIG. 1;

FIG. 3 is a circuit diagram illustrating the pulse widening circuit of the system of FIG. 1; and FIG. 4 is a graphical representation of the wave shapes and time relationships of signals encountered at various points in the circuit of FIG. 3.

DETAILED DESCRIPTION OF THE PREFERRED EMBODIMENT

FIG. 1 diagrammatically illustrates in block diagram form the recognition and identification system referred to by the reference character 10 and incorporating the teachings of the present invention. The system 10 includes a passive electrically-coded card 12 and an active electrical network, illustrated in dashed lines and referred to by the reference numeral 14.

The card 12 is in the form of an identification tag carrying two or more electrically passive tuned inductance-capacitance circuits 16 and 18. Typically, the card 12 is a standard size credit card and is carried by an individual or attached to an object to be recognized and identified. The tuned circuit 16 includes an inductor 20 and a capacitor 22 electrically interconnected to form a resonant circuit characterized by a resonant frequency $f_a$. The tuned circuit 18 includes an inductor 24 and a capacitor 26 interconnected to form a resonant circuit characterized by a resonant frequency $f_b$. The resonant frequencies of the card 12 may be designated as codes which serve as a recognition or an identification of the particular individual or object to be identified. Hence, the card 12 is said to have two coded resonant frequencies $f_a$ and $f_b$. Alternatively, crystals resonant at the frequencies $f_a$ and $f_b$ may be used in place of the tuned circuits 16 and 18.

The active electrical network 14 includes a radio frequency sweep oscillator 28 having an output terminal 29. Connected to the output terminal 29 is an isolation amplifier 30 which is connected in a series configuration with an impedance element 32 and a sensing coil 34. The isolation amplifier 30 and the impedance element 32 provide a high output impedance which isolates oscillator 28 from variations in voltage across the coil 34. As shown, the impedance element 32 is a resistor, although it should be recognized that other circuit elements such as inductors or the natural output impedance associated with the amplifier 30 may be utilized. An amplifier 36 is connected to the junction between the impedance element 32 and the coil 34, and a detector 38 is connected in series with the amplifier 36. The detector 38 is responsive to positive and negative amplitude variations, or perturbations in the amplitude, of a substantially constant amplitude alternating current signal and is operative to convert each variation which falls below a predetermined threshold to a pulse corresponding to the time occurrence of the variation.

The radio frequency sweep oscillator 28 is also connected to an internal reference signal generating network, illustrated in dashed lines and referred to by the numeral 50. As illustrated, the internal reference signal generating network 50 includes an isolation amplifier 52 which is connected in a series configuration with an impedance element 54 and a sensing coil 56. An internal passive electrical circuit 58 in the form analogous to the card 12 includes a pair of passive tuned circuits 60 and 62. The tuned circuit 60 includes an inductance 64 and a capacitor 66 connected in parallel. The tuned circuit 62 includes an inductance 68 and a capacitor 70 connected in parallel. The values of the inductors 64 and 68 and the capacitors 66 and 70 are such that the circuits 60 and 62 have resonant frequencies $f_{a1}$ and $f_{b1}$. In the preferred embodiment the frequencies $f_{a1}$ and $f_{b1}$ of the internal reference network 50 are selected to be the same as the frequencies $f_a$ and $f_b$ of the external card 12. An amplifier 72 is connected to the junction between the impedance element 54 and the sensing coil 56. The output of the amplifier 72 is connected to a detector 74 which may be similar to the detector 38. The detector 74 is responsive to positive and negative amplitude variations of a constant amplitude alternating current signal which fall below a predetermined threshold and is operative to convert each variation to a pulse corresponding in time to the occurrence of the variation.

In accordance with the present invention a pulse widening circuit 80 having an input terminal 81 and an output terminal 82 has its input terminal 81 connected to the output terminal of the detector 74. The pulse widening circuit 80 serves to expand in time pulses applied to its input terminal 81.

A control signal generating means, illustrated in dashed lines and referred to by the reference numeral 83, is connected to the output terminal of the detector 38 and to the output terminal 82. The control signal generating means 83 includes a logical AND gate 40 having input terminals 39 and 42, and an output terminal 44. The AND gate 40 is responsive to the relative time position of input signals applied on the terminals 39 and 42, and is operative to produce an output signal in the event that there is time coincidence between the input signals. The output terminal 82 is also connected to a wave shaping network 84.

The wave shaping network 84, or differentiating network, includes a capacitor 86 connected to one terminal of a resistor 88. The other terminal of the resistor 88 is connected to ground. The wave shaping network 84 is responsive to a trailing edge, or negative going edge, of a pulse and is operative to differentiate the negative going edge so as to produce a negative pulse therefrom. A flip-flop circuit 90 having two output terminals 92 and 94 is connected to the output of the differentiating network 84. The output terminal 92 is normally in the high or "1" state and the output terminal 94 is normally in the low or "0" state. The flip-flop circuit 90 is responsive to negative pulses and is operative to switch the state of the signals appearing on the terminals 92 and 94.

A logical AND gate 96 is connected to the outpput terminals 44 and 92. The AND gate 96 is responsive to signals applied to its input terminals and is operative to provide an output pulse in the event that there is time coincidence between those signals. An integrator 98, or voltage comparator, is connected to the AND gate 96. The integrator 98 stores the voltage associated with each pulse applied to its input, compares the stored voltage with a predetermined threshold voltage, and produces an electrical signal when the stored voltage exceeds the threshold voltage. Typically, four input pulses from four consecutive sweeps will cause the integrator to produce an output pulse. If there are less than four pulses, the output of the integrator 98 will slowly decay to zero, reaching zero after 16 sweeps.

Similarly, a logical AND gate 100 is connected to the output terminals 44 and 94. The AND gate 100 is also responsive to signals applied to its input terminals and is operative to provide an output pulse in the event that there is time coincidence between those signals. An integrator 102, or voltage comparator, is connected to the AND gate 100. The integrator 102 may be similar to the integrator 98. The flip-flop 90 includes a reset terminal R that is connected to the sweep oscillator 28 and is adapted to receive reset pulses to initialize the flip-flop. An AND gate 104 having two input terminals connected to the integrators 98 and 102, and an output terminal 106 is of the type which produces a signal at its output terminal 106 in response to the time coincidence of signals applied to its input.

Referring to FIG. 2, the waveforms of the signals encountered at various points in the system of the present invention are illustrated. FIG. 2a represents the waveform of the signal generated by a single sweep of the sweep oscillator 28. As shown, this signal is an alternating current signal having a substantially constant amplitude as the oscillator repeatedly sweeps over a frequency range between the frequencies $F_1$ to $f_2$. The frequency change between the frequencies $f_1$ and $f_2$ is schematically illustrated by the continually decreasing period of a cycle of the signal. FIG. 2 represents the waveform of the reflected signal developed across the coil 34 and includes perturbations, or reductions in the amplitude of the potential across the coil which correspond in time to the resonant frequencies $f_a$ and $f_b$ of the tuned circuits 16 and 18. Additional perturbations $f_c$, $f_d$, $f_e$ and $f_f$ are shown in phantom and will be described subsequently. FIG. 2c illustrates the waveform of the condition pulse signal produced by the detector 38. FIG. 2d represents the waveform developed across the coil 56 and is similar in shape to the waveform of FIG. 2b. FIG. 2e represents the waveform of the reference pulse signal produced by the detector 74. FIG. 2f illustrates the waveform of the widened reference pulse signal produced at the output terminal 82 of the pulse widening circuit 80. FIGS. 2g and 2h illustrate the waveforms of condition pulse signals corresponding to the resonant frequencies $f_c$ and $f_d$, and $f_e$ and $f_f$, respectively. FIG. 2i illustrates the waveform of the signal produced at the output of the logical AND gate 40. The pulses shown in phantom are produced by the condition pulse signal of FIG. 2g.

FIG. 3 illustrates a schematic diagram of the pulse widening circuit 80. An operational amplifier 112 is connected to the input terminal 81 for amplifying and inverting signals applied thereto. Because of the signal inversion associated with the amplifier 12, an inverter 114 is connected to the output terminal of the amplifier 112 and serves to invert the amplifier signal. A diode 116 is connected to the inverter 114. The anode electrode of the diode 116 is connected to one terminal of a capacitor 118. The other terminal of capacitor 118 is connected to ground. The positive terminal of a bias voltage source 120 is serially connected to one terminal of a bias resistor 122 which has its other terminal connected to the junction between the diode 116 and the capacitor 118 and to the base electrode of an NPN transistor 124. The emitter of transistor 124 is grounded and the collector is connected through a resistor 126 to the positive terminal of the voltage source 120.

Referring to FIG. 4, the waveforms of the signals encountered at various points in the pulse widening circuit 80 are illustrated. FIG. 4a represents the waveform of the signal at the output of the inverter 114. FIG. 4b represents the waveform of the signal at the base of the transistor 124. FIG. 4c represents the waveform of the output signal at the collector of the transistor 124.

In operation, the radio frequency sweep oscillator 28 is energized so as to provide the alternating current sweep signal which has a constant amplitude and a frequency that varies with time between $f_1$ and $f_2$ as shown in FIG. 2a. The sweep signal is amplified by the amplifier 30 and applied to the sensing coil 34 which has a constant amplitude alternating current potential developed across it, and by transformer action, generates an electromagnetic field within an exterior sensing zone proximate to the coil. As the coded passive card 12 is moved into the sensing zone, the coils 20 and 24 function as a secondary of the transformer and the electromagnetic field inductively couples the resonant circuits 16 and 18, respectively, to the sensing coil 34. Accordingly, the load and resonance of the card 12 are reflected across the sensing coil 34 which decreases the amplitude of the potential developed across the sensing coil 34 at frequencies coinciding with the resonant frequencies $f_a$ and $f_b$ as shown in FIG. 2b. Although only one sweep is illustrated, it should be recognized that these amplitude reductions repeatedly occur as the sweep signal passes through the resonant frequencies and the passive circuit 12 is within the sensing zone.

The reflected signal is thereafter amplified by the amplifier 36 and applied to the detector 38. The detector 38 responds to the potential developed across the sensing coil 34 and produces a condition pulse each time the potential drops below a predetermined threshold. The condition pulse signal is illustrated in FIG. 2c. The duration of the condition pulse corresponds to the time that the potential remains below the threshold of the detector 38. Thus, the time occurrence of the condition pulses represent the frequencies of the sweep signal which correspond to the resonant frequencies $f_a$ and $f_b$ of the card 12.

The sweep signal is also amplified by the amplifier 52 and applied to the sensing coil 56 of the internal reference signal generating network 50. In a manner similar to that described, an internal reference electromagnetic field is generated within an internal sensing zone proximate coil 56 and is coupled to the tuned circuits 60 and 62. Hence, the load and the resonance of the tuned circuits 60 and 62 are reflected across the coil 56 to produce the reflected signal illustrated in FIG. 2d. The reflected signal has a format similar to that illustrated in FIG. 2b with the perturbations occurring at the resonant frequencies $f_{a1}$ and $f_{b1}$ as the sweep signal repeatedly sweeps through the frequency range $f_1$ to $f_2$. If $f_{a1}$ and $f_{b1}$ of the internal passive circuit 58 are the same as $f_a$ and $f_b$ of the external card 12, the perturbations in the reflected signals occur simultaneously.

The reflected signal is thereafter amplified by the amplifier 72 and applied to the detector 72 which, similar to the detector 38, converts the variations in potential which fall below the predetermined threshold to reference pulses, thus forming the reference pulse signal illustrated in FIG. 2e. The time occurrence of the reference pulses represents the frequency of the sweep signal corresponding to the resonant frequencies $f_a$ and $f_b$ of the tuned circuits 60 and 62.

Prior to the application of the reference pulse signal of FIG. 2e, to the pulse widening circuit 80, the output terminal of the amplifier 112 is slightly positive, and current flows from the voltage source 120 through resistor 122 to the base of the transistor 124 such that the transistor is rendered conducting. When the reference pulse signal is generated, the output of the amplifier 112 rises. Because of the signal inversion due to the inverter 114 the output of the inverter dips negative, as shown in FIG. 4a, and the diode 116 conducts. Thus, the voltage across the capacitor 118, illustrated in FIG. 4b, is also pulled negative. Consequently, the voltage at the base of the transistor 124 is pulled down, thereby causing the transistor to turn off such that the voltage on its collector rises, as shown occurring at time T1 in FIG. 4c. At the end of the reference signal, the output of the amplifier 112 rises to its high state. However, the diode 116 prevents the capacitor 118 from charging immediately to its high state. Instead, the voltage across the capacitor 118 rises linearly as the capacitor charges from the current conducted through resistor 122. At time T2 when the voltage across the capacitor finally reaches the high state, transistor 124 is again rendered conductive causing the output signal to drop to its low state. This output signal is thus effectively stretched or "maisoned" so as to form the widened reference pulse signal illustrated in FIGS. 2f and 4c and having a duration from T1 to T2. If should be noted that the leading edge of the stretched pulse is formed by the passive circuit 58. Since the internal circuit 58 comprises two resonant frequencies, two widened pulses are formed during each sweep of the oscillator 28. Typically, the duration of the widened reference pulse is from two to twenty times the duration of the reference pulse signal.

The condition pulse signal and the widened reference pulse signal are applied to the input terminals 39 and 42, respectively, and of the AND gate 40 which provides the signal illustrated in FIG. 2i on its output terminal 44 since there is time coincidence between the signals. This signal is applied to an input terminal of the respective AND gates 96 and 100. The AND gate 40 produces such a signal when the pulses from the coded resonant frequencies of the card 12 fall within the stretched pulse from the pulse widener 80.

Conversely, if the coded resonant frequencies of the card 12 are nonexistent, then no condition pulse signal would be generated. Moreover, if the coded resonant frequencies of the card 12 occur at the frequencies $f_e$ and $f_f$ as illustrated in phantom in FIG. 2b, then the condition pulses shown in FIG. 2h are generated. Since these pulses do not occur within the duration of the widened reference pulse, no signal would be conducted through the AND gate 40.

Due to the widening of the reference pulse signal, if the coded resonant frequencies of the circuits 16 and 18 occur at frequencies $f_c$ and $f_d$, as illustrated in phantom in FIG. 2b, then the condition pulse signal illustrated in FIG. 2g is produced at the output of the detector 38. Since this condition pulse signal includes pulses which are in time coincidence with the widened reference pulse signal, the signal illustrated in phantom in FIG. 2i is produced at the output of the AND gate 40.

Concurrently with being applied to the AND gate 40, the widened reference pulse signal is applied to the wave shaping network 84 which differentiates the signal and produces a negative pulse from its negative-going edge. The negative pulse serves to trigger the flip-flop 90 such that the signals appearing at its output terminals 92 and 94 change states. Consequently, signals in the high state are applied alternately to the AND gates 96 or 100, thus rendering the gates conducting during the occurrence of alternate condition pulses conducted through the AND gate 40. Hence, every other condition pulse conducted through the AND gate 40 is applied to the respective integrators 98 and 102.

The integrators 98 and 102 develop a voltage in response to the pulses conducted through the respective AND gates 96 and 100. When this voltage exceeds a threshold voltage, the integrators 98 and 102 produce an output signal. In the preferred embodiment this occurs when four pulses have been conducted. Thus, provided the coded passive electrical circuit 12 resonant at frequencies $f_a$ and $f_b$ is maintained proximate the coil 34 during four oscillator sweeps, the integrators 98 and 102 each produce signals. Because of the time coincidence of these signals the AND gate 104 conducts, thus providing a control, or an "OK" signal, at the output terminal 106 for use in controlling the opening of a door (not shown). After preselected number of sweeps have occurred, the sweep oscillator 28 generates a reset signal which is applied to the R terminals of the flip-flop 90 and to the integrators 98 and 102.

It should be recognized that if the card 12 is characterized by only one of the two coded resonant frequencies, e.g., is characterized by the frequencies $f_a$ and $f_f$, then although an output signal would be developed by the integrator 98, the integrator 102 would never receive pulses through the AND gate 100. After sixteen sweeps the output signal developed by the integrator 98 will decay.

From the above it should be recognized that any one of a family of external passive objects having coded resonant frequencies which correspondingly produce a family of condition pulse signals that occur within the duration of the widened reference pulse signal is able to be recognized and identified with the system of the present invention.

While the invention has been particularly shown and described with reference to a certain preferred embodiment, it will be understood by those skilled in the art that various alterations and modifications in form and detail may be made therein. Accordingly, it is intended that the following claims cover all such alterations and modifications as fall within the true spirit and scope of the invention.

What is claimed is:

1. An improved electronic recognition and identification system for identifying any one of a family of electrically-coded passive objects each having at least one tuned electrical circuit which is resonant at least one of a plurality of predetermined frequencies and is adapted to be brought within an external sensing zone, said system comprising:

a sensing coil for providing an electromagnetic field within said external sensing zone when energized by an alternating current signal;

signal source means for generating an alternating current signal for energizing said sensing coil, said alternating current signal having a frequency which varies with time over a range of frequencies including said plurality of predetermined frequencies and having a constant amplitude over said range, whereby when one of the external passive objects is brought within said external sensing zone the object is inductively coupled to said sensing coil by said electromagnetic field and loads said sensing coil when the frequency of said alternating current signal passes through said predetermined frequency such that the potential developed across said sensing coil is changed during the passage of said predetermined frequency;

detector means responsive to the potential developed across said sensing coil and operative to produce a condition pulse each time said potential drops below a predetermined threshold, the duration of said condition pulse corresponding to the time that said potential remains below said threshold;

generator means for producing a reference pulse when said alternating current signal passes through the frequency of the first encountered one of said predetermined frequencies;

pulse widening means responsive to said reference pulse and operative to provide a widened reference pulse having a duration that extends from the time corresponding to the occurrence of said first encountered frequency to the time corresponding to the passage of said alternating current signal through the last encountered one of said predetermined frequencies; and control signal generating means responsive to said condition pulse and said widened reference pulse and operative to produce a control signal when there is time coincidence between said condition pulse and said widened reference pulse.

2. An improved electronic recognition and identification system as recited in claim 1 wherein said pulse widening means includes means responsive to said reference pulse and operative to produce an integrated signal, and means responsive to said integrated signal and operative to produce said widened reference pulse whenever the magnitude of said integrated signal does not exceed a predetermined threshold.

3. An improved electronic recognition and identification system as recited in claim 2 wherein said means responsive to said reference pulse includes a diode and a capacitor having a terminal connected to said diode, said capacitor serving to store a voltage corresponding to said reference pulse and to develop said integrated signal therefrom, and said diode serving to control the discharge of said capacitor.

4. An improved electronic recognition and identification system as recited in claim 3 wherein said means responsive to said integrated signal includes a transistor having its base electrode connected to said terminal of said capacitor such that said transistor is rendered nonconducting upon application of said integrated signal to said base electrode, thereby producing said widened reference pulse.

5. An improved electronic recognition and identification system as recited in claim 4 and further comprising means connected to said terminal of said capacitor and to said collector of said transistor for biasing said transistor in a normally conducting state.

6. An improved electronic recognition and identification system as recited in claim 2 wherein said control signal generating means includes shaping means responsive to the trailing edge of said widened reference pulse and operative to produce a shaped pulse, means having first and second output terminals for providing first and second states of a bistate signal respectively thereon, said means having first and second output terminals responsive to said shaped pulse and operative to change the states of said signal on said first and second output terminals, and means responsive to said control signal and said state of said signal on said first output terminal and operative to produce a first output signal in the event that there is time coincidence between said control signal and said second state.

7. An improved electronic recognition and identification system as recited in claim 6 including means responsive to said control signal and said state of said signal on said second output terminal and operative to produce a second output signal in the event that there is time coincidence between said control signal and said first state.

8. An improved electronic recognition and identification system as recited in claim 7 and further comprising first means responsive to said first output signal and operative to produce a first integrated signal in the event that a predetermined number of first output signals occur, second means responsive to said second output signal and operative to produce a second integrated signal in the event that a predetermined number of second output signals occur, and means responsive to said first and second integrated signals and operative to produce an OK identification signal in the event there is time coincidence between said first and second integrated signals.

9. In an electronic recognition and identification system for identifying any one of a family of electrically-coded passive objects each having at least one tuned electrical circuit which is resonant at at least one of a plurality of predetermined frequencies comprising a sensing coil for providing an electromagnetic field within an external sensing zone when energized by an alternating current signal, signal source means for generating an alternating current signal for energizing said sensing coil, said alternating current signal having a frequency which varies with time over a range of frequencies including said plurality of predetermined frequencies and having a constant amplitude over said range, whereby when one of the external passive objects is brought within said external sensing zone the object is inductively coupled to said sensing coil by said electromagnetic field and loads said sensing coil when the frequency of said alternating current signal passes through said predetermined frequency such that the potential developed across said sensing coil is changed during the passage of said predetermined frequency, detector means responsive to the potential developed across said sensing coil and operative to produce a condition pulse each time said potential drops below a predetermined threshold, the duration of said condition pulse corresponding to the time that said potential remains below said threshold, generator means for producing a reference pulse when said alternating current signal passes through the frequency of the first encountered one of said predetermined frequencies, and control signal generating means responsive to said condition pulse and said reference pulse and operative to produce a control signal when there is time coincidence between said condition pulse and said reference pulse, the improvement comprising pulse widening means coupled between said generator means and said control signal generating means for providing widened reference pulses having a duration that extends from the time corresponding to the occurrence of said first encountered frequency to the time corresponding to the passage of said alternating current signal through the last encountered one of said predetermined frequencies.

* * * * *